United States Patent
Kim

[11] Patent Number: 6,037,989
[45] Date of Patent: Mar. 14, 2000

[54] STILL IMAGE TRANSMITTING DEVICE

[75] Inventor: Yong-Je Kim, Suwon, Rep. of Korea

[73] Assignee: Samsung Electronics Co., Ltd., Kyungki-do, Rep. of Korea

[21] Appl. No.: 08/969,677

[22] Filed: Nov. 13, 1997

[30] Foreign Application Priority Data

Jan. 11, 1997 [KR] Rep. of Korea ............... 97-612

[51] Int. Cl.[7] .................................................. H04N 7/01
[52] U.S. Cl. .................... 348/441; 348/552; 348/502; 386/131; 386/40; 345/327
[58] Field of Search .................................. 348/423, 845, 348/845.1, 845.2, 845.3, 384, 390, 400, 400.1, 400.2, 400.3, 405, 409, 441, 552, 501, 18, 17; 345/327; 386/131, 40, 38, 26, 37, 95, 83; H04N 7/01

[56] References Cited

U.S. PATENT DOCUMENTS

| | | | |
|---|---|---|---|
| 5,285,263 | 2/1994 | Fujita | 348/441 |
| 5,455,629 | 10/1995 | Sun et al. | 348/466 |
| 5,459,520 | 10/1995 | Sasaki | 348/445 |
| 5,497,404 | 3/1996 | Grover et al. | 375/357 |
| 5,513,010 | 4/1996 | Kori et al. | 348/341 |
| 5,572,331 | 11/1996 | Yu | 386/46 |
| 5,611,038 | 3/1997 | Shaw et al. | 395/806 |
| 5,691,767 | 11/1997 | Tahara | 348/384 |
| 5,751,445 | 5/1998 | Masunaga | 358/426 |

FOREIGN PATENT DOCUMENTS

| | | | |
|---|---|---|---|
| 0 729 266 | 8/1996 | European Pat. Off. | H04N 1/21 |
| 4-35478 | 2/1992 | Japan | H04N 5/91 |
| 5-7355 | 1/1993 | Japan | H04N 5/91 |
| 6-233226 | 8/1994 | Japan | H04N 5/781 |
| 7-298190 | 11/1995 | Japan | H04N 5/91 |
| WO 92/09169 | 5/1992 | WIPO | H04N 5/30 |

Primary Examiner—Michael H. Lee
Attorney, Agent, or Firm—Sughrue, Mion, Zinn Macpeak & Seas, PLLC

[57] ABSTRACT

A still image transmitting device including a control unit, a demodulating unit for converting 25-bit data reproduced from a video tape into 24-bit data, an error correction unit that receives the 24-bit image data and corrects errors caused by the video tape, a data restoring unit for restoring original data by performing an inverse discrete cosine transform, variable length decoding, run length decoding, and de-quantization with compressed data and storing the restored data in a shuffle memory before de-shuffling. A sync signal insertion and over sampling unit is provided for converting the de-shuffled image data into a composite video broadcasting signal to output to a monitor or for converting the de-shuffled image signal into luminance and color signals. A still image transmitting unit transmits still image data according to control signals transmitted by the control unit, and an interface unit transmits control signals from the personal computer to the still image transmitting unit, and also transmits an image signal produced by the still image transmitting unit to the personal computer.

3 Claims, 3 Drawing Sheets

STILL IMAGE TRANSMITTING DEVICE

BACKGROUND OF THE INVENTION

1. Field of the Invention

This invention relates to a still image transmitting device. Specifically, this invention is a still image transmitting device for transmitting video signals, filmed using a camcorder, to a personal computer for editing.

2. Description of the Related Art

To edit video signals filmed using a camcorder, still image signals are transmitted to a personal computer. The personal computer makes it possible to add a desired video signal to the still image signals received or to create special effects. It is also possible to transmit video signals from a television to a personal computer as still images.

SUMMARY OF THE INVENTION

An object of the present invention is to provide a still image transmitting device for transmitting the video signal from a camcorder or television to a personal computer after converting the video signal into a still image.

To achieve the above-noted object of the present invention, a still image transmitting device includes: a control unit for generating still image transmit commands, servo control commands, and control signals for error correction; a demodulating unit for converting 25-bit data reproduced from a video tape into 24-bit data; an error correction unit that receives the 24-bit image data and corrects errors; a data restoring unit for restoring original data by performing an inverse discrete cosine transform, variable length decoding, run length decoding, and de-quantization with compressed data and storing the restored data in a shuffle memory before de-shuffling; a sync signal insertion and over-sampling unit for converting the de-shuffled image data into a composite video broadcasting signal to output to a monitor or converting the de-shuffled image signal into luminance and color signals; a still image transmitting unit for preparing a transmission according to control signals transmitted by the control unit and transmitting the image data when an image transmission start signal and transmission speed are input; and an interface unit for transmitting the image transmission start signal and transmission speed generated by the personal computer to the still image transmitting unit, and transmitting an image signal produced by the still image transmitting unit to the personal computer.

BRIEF DESCRIPTION OF THE DRAWINGS

The preferred embodiments of the present invention are described with reference to the accompanying drawings wherein.

DETAILED DESCRIPTION OF THE PREFERRED EMBODIMENT

With reference to the attached drawings, the present invention is described below in detail.

Figure 1:
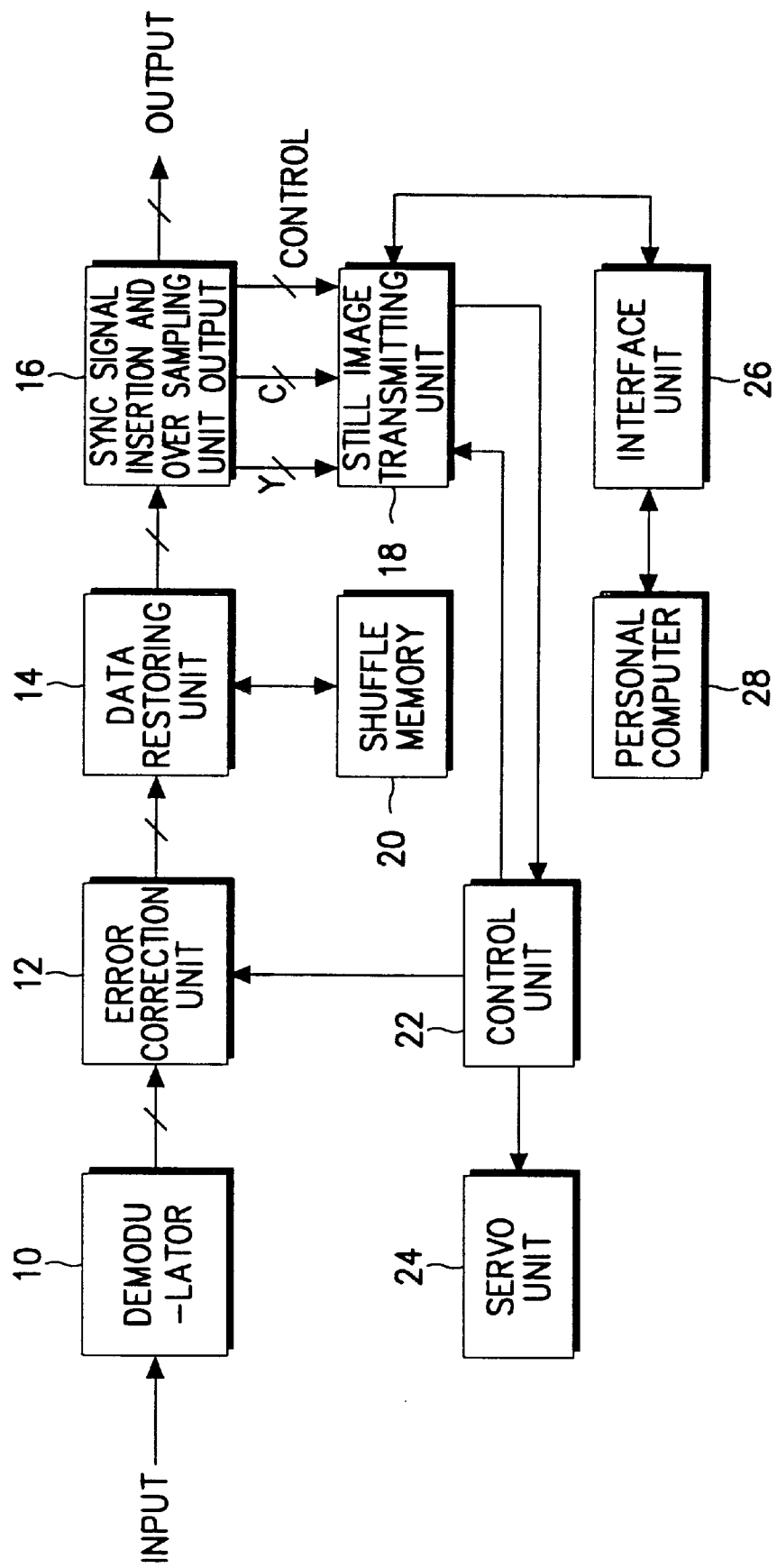
FIG. 1 is a block diagram of a still image transmitting device according to the present invention.

As shown in FIG. 1, control unit 22 generates and outputs still image transmit commands, servo control commands, and control signals for error corrections. Demodulator 10 converts 25-bit data reproduced from a video tape into 24-bit data, and sends it to an error correction unit 12. The error correction unit 12 receives the reproduced video data, converted into 24-bit values, corrects errors from the video tape, and sends the data to a data restoring unit 14. The data restoring unit 14 restores original data by performing an inverse discrete cosine transform (IDCT), variable length decoding (VLD), run length decoding (RLD), and de-quantization with compressed data, and stores the data in a shuffle memory 20 before de-shuffling and sending it to sync signal insertion and over sampling unit 16. Sync signal insertion and over sampling unit 16 converts the data into a composite video signal before sending it to a monitor, or sends data in the form of luminance and color signals to still image transmitting unit 18. Still image transmitting unit 18 prepares the transmission according to the control signal input by control unit 22, and transmits video data when a video transmission start signal and transmission speed are entered. A personal computer 28 sends the transmission start signal and the transmission speed to interface unit 26, which receives the video data from the still image transmitting unit 18. The interface unit 26 interfaces personal computer 28 and still image transmitting unit 18. Interface unit 26 transmits the video transmission start signal and the transmission speed from the personal computer 28 to the still image transmitting unit 18, and transmits the video signal from the still image transmitting unit 18 to the personal computer 28. Servo unit 24, under the control of control unit 22, controls each servo.

Figure 2:
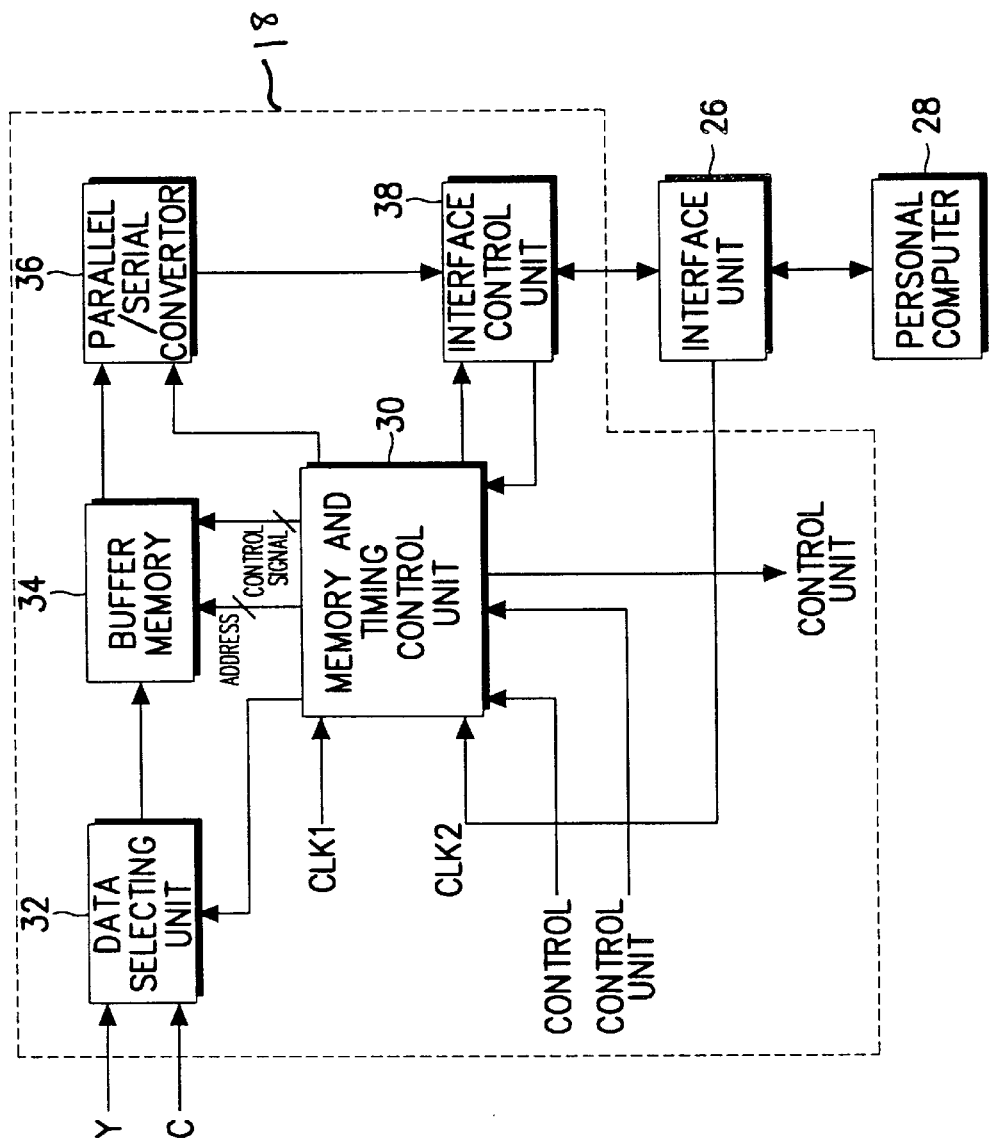
FIG. 2 is a detailed block diagram of the still image transmitting unit shown in FIG. 1, according to the present invention.

As shown in FIG. 2, a memory and timing control unit 30 receives first and second clock signals, CLK1 and CLK2, and the video transmission start signal and the transmission speed from the interface unit 26, and generates memory control signals and timing control signals for each unit. A data selecting unit 32 receives the luminance and color signals from the sync signal insertion and over sampling unit 16, selects one of them, according to a data selection signal transmitted from memory and timing control unit 30, and sends the selected signal to buffer memory 34. Buffer memory 34 records or reads the luminance signal or color signal, selectively output by data selecting unit 32, according to an address signal and a control signal generated by memory and timing control unit 30. Parallel/serial convertor 36 converts the signal from buffer memory 34 into serial data and sends it to interface control unit 38. Interface control unit 38 arranges data to an interface format of the personal computer 28, and sends the data to the interface unit 26.

With reference to FIGS. 1 and 2, the operation of the preferred embodiment of the present invention is described below in detail.

Demodulator 10 converts and demodulates the 25-bit data reproduced from video tape into 24-bit data; that is, it removes redundancy one bit. The demodulated data is sent to error correction unit 12. Error correction unit 12 corrects errors in the data caused by scratches or dust on the tape. Data which is not corrected at this time is replaced with data from a preceding frame stored in a frame memory in the error correction unit 12 (not shown). This operation is called a concealment. When receiving a still image command from still image transmitting unit 18, control unit 22 controls the error correction unit 12 to load only the data of the present frame from the frame memory and send the data to the data restoring unit 14. Data restoring unit 14 restores the original video signal from the compressed video signal using the following operations. After passing through the processes of VLD, RLD, and de-quantization, time domain data is made through IDCT. The compressed video data, which is shuffled in case of compressing, is then de-shuffled. De-shuffling is possible by reading data after recording it in a shuffle memory 20. The de-shuffled data is sent to sync signal insertion and over sampling unit 16. The de-shuffled data, where Y, Cr, and Cb are formed in the ratio of 4:1:1, increases its color rate by sync signal insertion and over sampling unit 16, resulting in the ratio of 4:2:2. Sync signal insertion and over sampling unit 16 also inserts a sync signal into the data to generate a composite video broadcasting signal or luminance and color signals, or generate Y, Cr, and Cb. Still image transmitting unit 18, which receives the luminance and color signals, sends a video transmission standby command to the personal computer 28 through the interface unit 26, when it receives the still image transmit command from the control unit 22. Still image transmitting unit 18 arranges data in the format compatible with the interface in the personal computer 28, and transmits the data to interface unit 26 at a transmission speed corresponding to the type of personal computer 28, for example, 57.6 Kbps or 115.2 Kbps. Interface unit 26 adjusts the voltage to the interface voltage of the personal computer 28 and transmits the still video signal to the personal computer 28. When transmitting the still images, control unit 22 controls the memory in the error correction unit 12 not to record data newly input, and to send the data of one frame in the memory to data restoring unit 14. Servo unit 24 temporarily stops during the still image transmission.

While all the elements other than the personal computer 28 stop their operations, personal computer 28 sends an image transmit command to interface unit 26. Interface unit 26 then adjusts the voltage and applies it to the still image transmitting unit 18. Still image transmitting unit 18 decodes information received from personal computer 28, through interface unit 26, and sends data to personal computer 28 through interface unit 26 at the relevant transmission speed. After finishing the transmission, still image transmitting unit 18 transmits a completion signal to control unit 22 to prepare the system for another transmission. Personal computer 28 recognizes the amount of data or the completion signal input by still image transmitting unit 18, thus completing a data input. Finally, if the transmit command is sent from personal computer 28 to still image transmitting unit 18, remaining elements other than still image transmitting unit 18, interface unit 26, and personal computer 28, are operated in a motion mode. When a user wants to newly transmit another image to personal computer 28 while watching images on a monitor, he/she inputs a transmit command to personal computer 28 by a key operation. The transmit command is sent from personal computer 28 to still image transmitting unit 18 through interface unit 26. Image transmitting unit 18 decodes the command from personal computer 28, through interface unit 26, and sends a stop command to control unit 22. The system is then standing by while in a stop mode. During the stop mode, data which was input to sync signal insertion and over sampling unit 16 is transmitted to personal computer 28 through interface unit 26 at a specified transmission speed. When the transmission is complete, still image transmitting unit 18 sends a completion signal to personal computer 28 or control unit 22, thus allowing the system to perform the next operation. When receiving the still image signal as illustrated above, personal computer 28 stores the image signal reproduced by a camcorder or VCR, and makes it possible to edit the image signal.

With reference to FIG. 2, the operation of still image transmitting unit 18 as it transmits a still image signal to personal computer 28 is described in detail. The luminance and color signals produced by sync signal insertion and over sampling unit 16 are applied to data selecting unit 32. Horizontal and vertical sync signals and the first and second clock signals (CLK1 and CLK2) are sent to memory and timing control unit 30. When receiving an image transmit command from control unit 22, memory and timing control unit 30 generates a control signal to control the output of data selecting unit 32 and sends an address and control signal to buffer memory 34. The data selectively output by data selecting unit 32 is recorded in buffer memory 34. After a predetermined period of time, the recorded signal is read based upon the horizontal and vertical sync signals. A reference clock signal of the read signal is the second clock signal, CLK2, which is related to a transmission speed of personal computer 28. The read signal is converted from a parallel signal to a serial signal by parallel/serial convertor 36 before being sent to interface control unit 38. Interface control unit 38 adjusts the data transmission to be compatible with standard, RS232C. Interface control unit 38 allows the data to be recognized by the port, RS232C, in personal computer 28 by adding a start bit and end bit, before sending the data to interface unit 26. Interface unit 26 adjusts the voltage to the voltage level of personal computer 28 and sends the data to personal computer 28. When the data transmission is completed, memory and timing control unit 30 sends a transmission completion signal to control unit 22. Since RS232C allows two-way communications, the transmission speed, transmission time point, and a predetermined protocols can be transmitted from personal computer 28 to the system. Such commands from personal computer 28 are sent to interface control unit 38 through interface unit 26. Interface control unit 38 decodes the data received and sends the transmission speed and time point to memory and timing control unit 30, thus the still image transmitting operation described above is performed.

Figure 3:
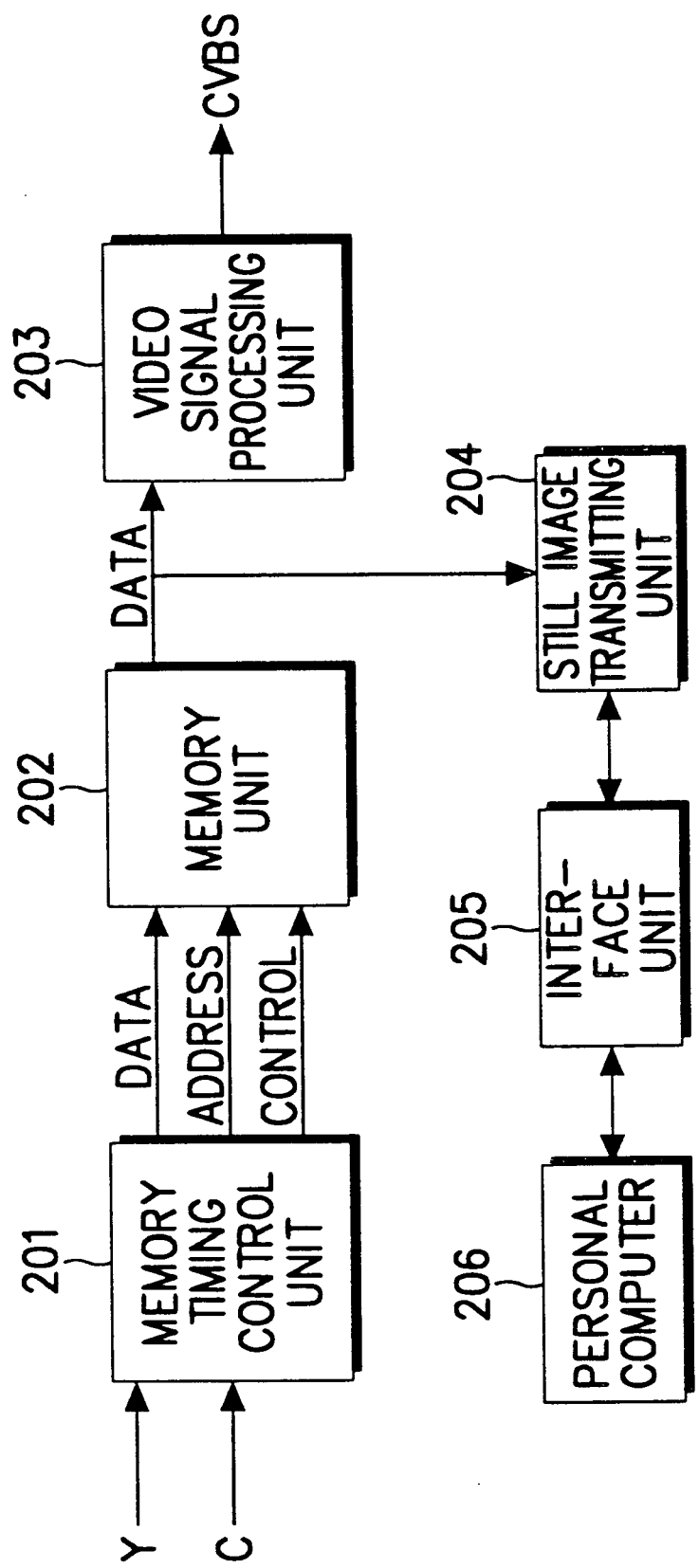
FIG. 3 is a block diagram of a still image transmitting device of a television or VCR system which performs digital processes with data, according to the present invention.

FIG. 3 is a block diagram of a still image transmitting device of a television or VCR system which performs a digital process with data, according to the present invention.

A digital luminance signal, Y, and color signal, C, are input to memory timing control unit 201. The digital color signal, C, may be a color-difference signal (R-Y, B-Y). Memory timing control unit 201 stores the digital luminance signal, Y, and color signal, C, in memory unit 202. The data stored is read and sent to video signal processing unit 203. Video signal processing unit 203 performs standard signal processes, such as filtering and screen complement, with the data and produces a composite video broadcasting signal (CVBS) or a luminance signal, Y, and color signal, C. The data read from memory unit 202 is sent to still image transmitting unit 204. Still image transmitting unit 204 prepares a transmission of a still image or a real time dynamic image if the volume of image data is small, and transmits the data to interface unit 205 at a predetermined speed when receiving an image transmit command from personal computer 206. Interface unit 205 adjusts the voltage and sends the data to personal computer 206. The data is transmitted serially. The personal computer can transmit information necessary for various control operations to still image transmitting unit 204 through interface unit 205.

As illustrated, this invention converts the image signal reproduced by a camcorder, TV, or VCR into serial data and transmits it to a personal computer as a still image signal, thereby making it possible to edit, store, or print the image signal, resulting in convenient use.

While only certain embodiments of the invention have been specifically described herein, it will apparent that numerous modifications may be made thereto without departing from the spirit and scope of the invention.

What is claimed is:

1. A still image transmitting device for transmitting a video image signal to a personal computer as a still image, comprising:

a control unit for generating still image transmit commands, servo control commands, and control signals for error correction;

a demodulating unit for converting 25-bit data reproduced from a video tape into 24-bit reproduced image data received from said error correction unit by performing an inverse discrete cosine transform, variable length decoding, run length decoding, and de-quantization with compressed data, storing restored data in a shuffle memory, and for deshuffling said restored data;

a sync signal insertion and over sampling unit for converting said restored data into a composite video broadcasting signal, which includes luminance and color signals, to output to a monitor, said sync signal insertion and oversampling unit being operative to receive digital signals having a first format, oversample said signals to produce oversampled signals having a second format, and to insert vertical and horizontal signals into said oversampled signals; a still image transmitting unit, which receives said luminance and color signals from said sync signal insertion and over sampling unit, for transmitting a still image signal, in accordance with control signals supplied by the control unit, when an image transmission start signal and transmission speed are input; and an interface unit for transmitting the image transmission start signal and the transmission speed generated by the personal computer to said still image transmitting unit, and transmitting said still image signal, produced by said still image transmitting unit, to the personal computer.

2. The still image transmitting device according to claim 1, wherein said still image transmitting unit comprises:

a memory and timing control unit for receiving said image transmission start signal and said transmission speed from said interface unit, along with first and second clock signals, and for generating a memory control signal and timing control signals;

a data selecting unit for selecting one of said luminance signal and said color signal, supplied from said sync signal insertion and over sampling unit, according to a data selection signal, generated by said memory and timing control unit, to output a selected signal;

a buffer memory for storing said selected signal according to an address and control signal supplied by said memory and timing control unit;

a parallel/serial convertor for converting said selected signal read from said buffer memory into serial data; and an interface control unit for arranging said serial data according to an interface format of the personal computer, and transmitting said serial data to said interface unit.

3. The still image transmitting device according to claim 2, wherein said interface format is a standard, RS232C.

* * * * *